No. 654,805. Patented July 31, 1900.
W. H. SAUVAGE.
AUTOMATIC BRAKE SHOE.
(Application filed Oct. 30, 1899.)

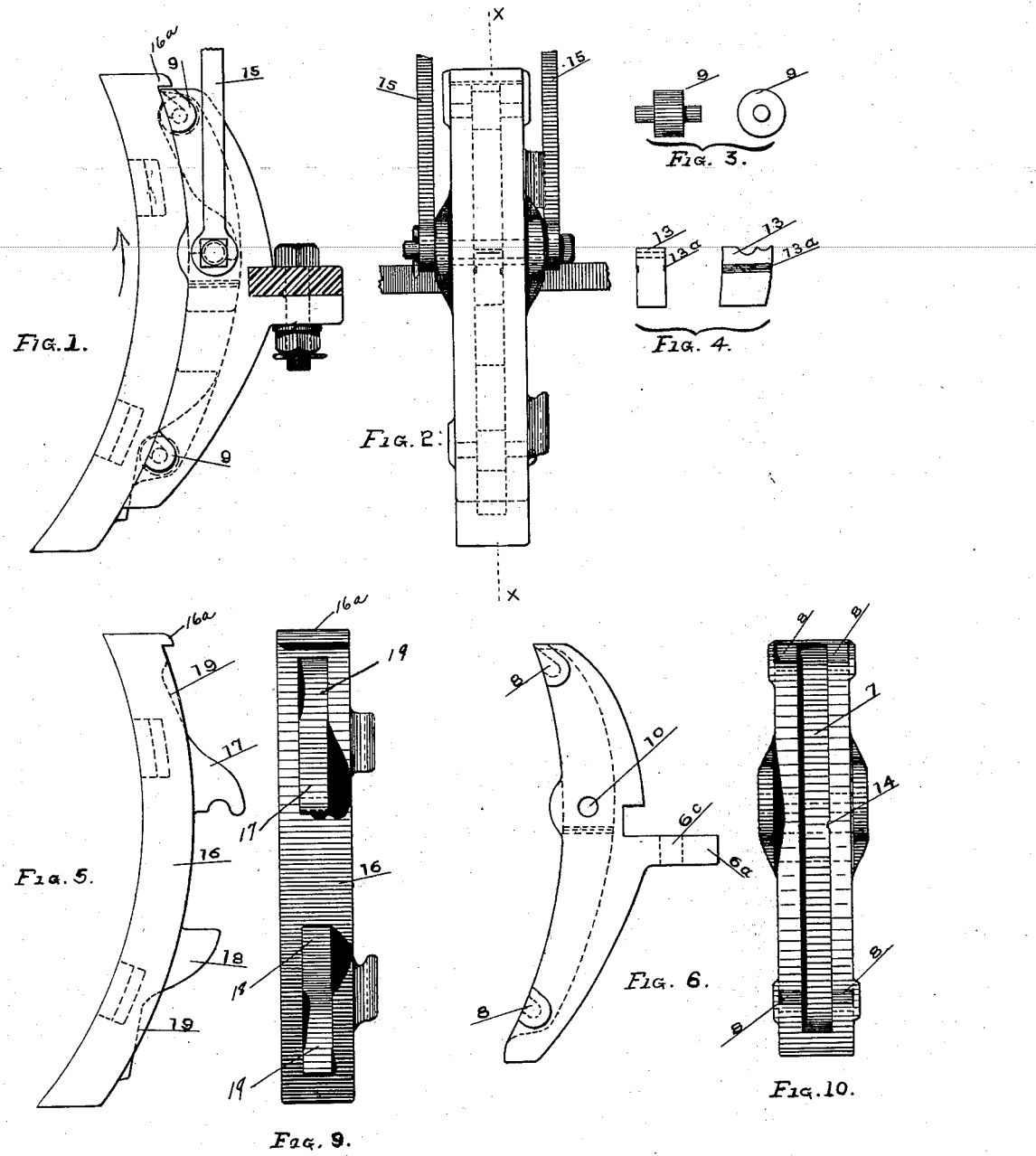

(No Model.) 2 Sheets—Sheet 2.

WITNESS:
Grace Mytinger
J. H. Backenfeld

INVENTOR
William Henry Sauvage
BY
ATTORNEY

THE NORRIS PETERS CO., PHOTO-LITHO., WASHINGTON, D. C.

UNITED STATES PATENT OFFICE.

WILLIAM HENRY SAUVAGE, OF DENVER, COLORADO, ASSIGNOR OF ONE-THIRD TO HENRY NEWTON WOOD, OF SAME PLACE.

AUTOMATIC BRAKE-SHOE.

SPECIFICATION forming part of Letters Patent No. 654,805, dated July 31, 1900.

Application filed October 30, 1899. Serial No. 735,264. (No model.)

*To all whom it may concern:*

Be it known that I, WILLIAM HENRY SAUVAGE, a citizen of the United States of America, residing at Denver, in the county of Arapahoe and State of Colorado, have invented certain new and useful Improvements in Automatic Brake-Shoes; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in automatic brake-shoes; and it consists of the features, arrangements, and combinations hereinafter described and claimed, all of which will be fully understood by reference to the accompanying drawings, in which is illustrated an embodiment thereof.

Figure 7:
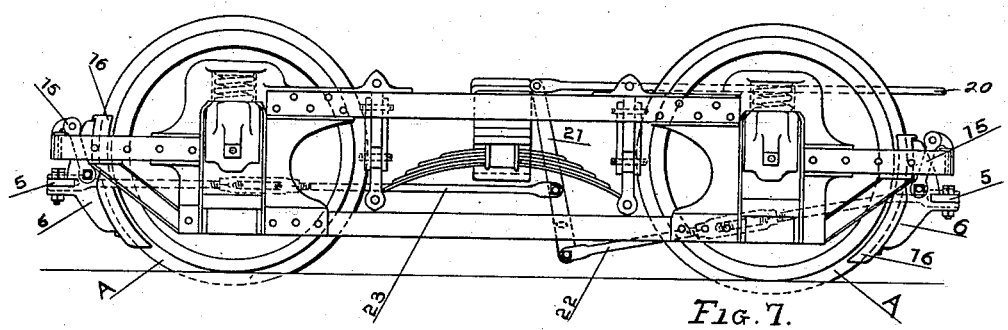
Figure 8:
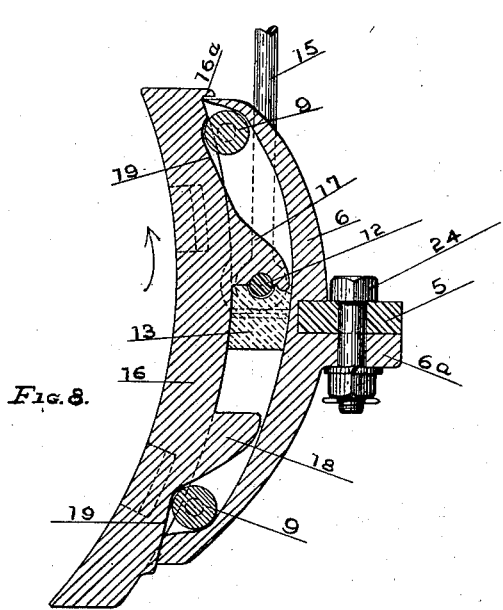
Figure 11:
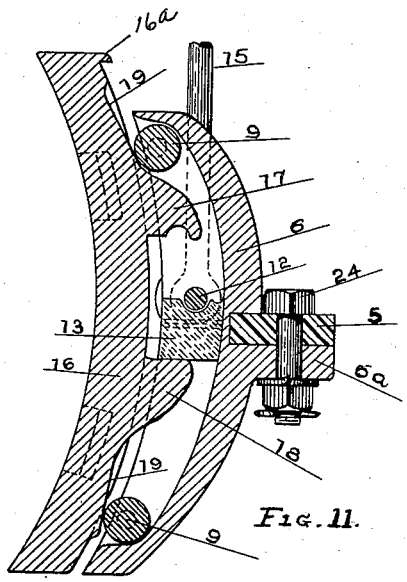

In the drawings, Figure 1 is a side elevation of my improved device, the brake-beam being shown in cross-section. Fig. 2 is a front view of the same. Fig. 3 illustrates an antifrictional roller shown in two positions. Fig. 4 illustrates a rubber cushion shown in detail and in two positions. Fig. 5 is a side elevation of the brake-shoe proper. Fig. 6 is similar view of the brake-head. Fig. 7 is a side elevation of a truck with my improved brake-shoe applied. Fig. 8 is a central longitudinal section taken on the line X X, Fig. 2. Fig. 9 is a rear view of the brake-shoe. Fig. 10 is a front view of the brake-head. Fig. 11 is a section similar to Fig. 8, but with the brake-shoe raised.

Similar reference characters indicating corresponding parts in the views, let the numeral 5 designate the brake-beam or other suitable support upon which the brake-head 6 is mounted, the said beam being adapted to be moved back and forth in a horizontal or approximately-horizontal plane. The brake-head is rigidly secured to the support 5 and is provided with a central groove 7, formed in its front face. Near the extremities of this head recesses 8 are formed on opposite sides of the groove 7, forming bearings for the journals of antifrictional rollers 9, which are located in the grooves and whose peripheries protrude therefrom. Passed transversely through the openings 10, formed in the head intermediate the rollers, is a bolt 12, below and engaging which is a cushion 13, composed of rubber or other suitable material. This cushion is provided with shallow grooves $13^a$, located on opposite sides and adapted to engage counterpart tongues 14, formed in the head on opposite sides of the groove 7 to hold the cushion in place. The upper surface of the cushion is fashioned to engage the bolt 12, which forms a stop against its further upward movement. This bolt also serves for the adjustment of the supporting-links 15, whose upper extremities are attached to the truck-frame.

The shoe 16 is provided on its rear face with two projections 17 and 18, adapted to enter the groove 7 of the head at points above and below the bolt 12. When the shoe is in its normal or inactive position, the projection 17 rests on the bolt 12. The said projection is slightly recessed to fit the upper part of the bolt. Formed on the rear face of the shoe and near each extremity thereof is an inclined face 19. These faces are engaged by the rollers 9 of the head, and they extend rearwardly and downwardly from the point of normal engagement of the rollers when the shoes are idle or from the upper extremities of the said faces.

In applying the brake it is only necessary to move the brake-beam 5 toward the tread of the wheel A sufficiently to bring the shoe in contact therewith. When the wheel is moving in the direction indicated by the arrows in Figs. 1 and 8, the friction of the wheel with the shoe automatically causes the shoe to travel upwardly, whereby it is forced tightly against the wheel by a wedging action, separating the shoe from the head by virtue of the engagement of the rollers with the inclined faces of the shoe. As the shoe moves upwardly the projection 18 engages the cushion 13, which limits the upward movement of the shoe. This construction makes the action of the shoe noiseless, and it also allows the shoe a varying movement to compensate for uneven tread of wheels, which are often so badly worn that they have an eccentric motion instead of moving in a true circle.

This construction allows the shoe to move upward at the points of greatest radius of the wheel, and hence presents an important advantage over a rigid stop.

It will be observed that my improved shoe only works automatically when the wheel is turning in a direction to move the shoe upward, as indicated by the arrows in Figs. 1 and 8. In use, however, there are two sets of shoes engaging the opposite faces of the two pairs of truck-wheels, as shown in Fig. 7. One pair of shoes always acts automatically and, by virtue of the connection between the two sets of shoes, the other set is also drawn tight on the tread of the wheels.

The connection between the brake-beams (shown in Fig. 7) is of ordinary construction. The brake-rod 20 is connected with the top of an arm 21, whose lower extremity is connected with a rod 22, leading to one of the brake-beams 5. A rod 23, leading from the front brake-beam 5, is connected with the arm 21 at a suitable point intermediate its extremities.

The shoe 16 is provided with a lip 16$^a$, which overlaps the upper extremity of the head 6 when the shoe is inactive and occupying its lowest limit of movement.

As shown in the drawings, the brake-head 6 is connected with the brake-beam 5 by a bolt 24, passing through an opening 6$^c$, formed in a rearward projection 6$^a$ of the head. It is evident, however, that the brake-head may be connected with the brake-beam or other suitable support in any desired manner.

It must be understood that I do not limit the invention to the details of construction herein shown, as I am aware that many modifications may be employed without departing from the spirit of the invention.

Having thus described my invention, what I claim is—

1. The combination of a brake-head mounted on a suitable support and provided with a longitudinal groove formed in its front face, a bolt passed transversely through said head and through the groove, a cushion inserted in the groove below and engaging said bolt, a roller journaled in the head near each extremity and protruding from the groove, a shoe formed with two separated projections entering the groove of the head, one being below the cushion and the other above the bolt; the shoe being also provided with two inclined faces adapted to be engaged by the rollers of the head, said faces extending rearwardly and downwardly from the point of normal engagement with the rollers when the shoe is inactive.

2. The combination of a brake-head provided with a longitudinal groove formed in its front face, a stop located in said groove at a suitable point between its extremities, bearings located at the extremities of the groove, a shoe having projections formed on its rear side and adapted to enter the groove of the head, one projection being located above and the other below the stop, the shoe being provided with inclined faces adapted to engage the bearings of the head, the said faces extending rearwardly and downwardly from the point of normal engagement with the bearings.

3. The combination of a brake-head provided with a central longitudinal groove, and a sustained cushion located in said groove at a suitable point intermediate its extremities, a coöperating brake-shoe mounted on the head and having a rearward projection entering the groove of the head below the cushion, and means for automatically raising and separating the shoe from the head as the wheel engages the face of the shoe, the projection of the shoe engaging the cushion of the head to limit the upward movement of the shoe.

4. The combination of a brake-head and a coöperating shoe suitably mounted thereon, one of the said parts being provided with a stop-cushion and the other with an engaging part adapted to limit the travel of the shoe on the head, the shoe being provided at each extremity with an inclined face extending rearwardly and downwardly, the head being provided with suitable means for engaging the inclined faces of the shoe whereby as the shoe is raised by the friction of the wheel the brake is applied by forcing the shoe against the wheel.

5. The combination of a brake-head and a shoe mounted thereon, one of the said parts being provided with inclined faces at its extremities and the other part with bearings therefor, one of the said parts being also provided with a stop-cushion and the other with an engaging part adapted to limit the movement of the shoe on the head.

6. The combination of a brake-head and a coöperating shoe suitably mounted thereon, one of the said parts being provided with two inclined faces extending rearwardly and downwardly and the other part with bearings engaging said faces, both inclined faces of the one part being simultaneously in operative engagement with the bearings of the other part during the brake-applying operation.

7. The combination of a brake-head and a coöperating shoe suitably mounted thereon, one of the said parts being provided with two inclined faces and the other part with bearings engaging said faces, both inclined faces of the one part being simultaneously in operative engagement with the bearings of the other part during the brake-applying operation.

In testimony whereof I affix my signature in presence of two witnesses.

WILLIAM HENRY SAUVAGE.

Witnesses:
A. J. O'BRIEN,
CHARLES C. WELCH.

It is hereby certified that Letters Patent No. 654,805, granted July 31, 1900, upon the application of William Henry Sauvage, of Denver, Colorado, for an improvement in "Automatic Brake-Shoes," were erroneously issued to said Sauvage and Henry Newton Wood as assignee of one-third of the said invention; whereas said Letters Patent should have been issued to said *Sauvage and Henry Newton Wood and Charles C. Welch, said Wood and Welch being owners of two-thirds interest,* as shown by the record of assignments in this Office; and that the said Letters Patent should be read with this correction therein that the same may conform to the record of the case in the Patent Office.

Signed, countersigned, and sealed this 14th day of August, A. D., 1900.

[SEAL.]

F. L. CAMPBELL,
*Assistant Secretary of the Interior.*

Countersigned:

WALTER H. CHAMBERLIN,
*Acting Commissioner of Patents.*